United States Patent [19]
Schwetz et al.

[11] Patent Number: 5,803,935
[45] Date of Patent: Sep. 8, 1998

[54] DEVICE FOR CONVEYING AND SECTIONING OF SEPARATOR STRIP

[75] Inventors: Anton Schwetz, Ebersdorf; Josef Gruber, Birkfeld; Anton Papst, Hirnsdorf, all of Austria

[73] Assignee: BM Battery Machines GmbH, Sebersdorf, Austria

[21] Appl. No.: 770,163

[22] Filed: Dec. 19, 1996

[51] Int. Cl.⁶ .................................................. B23P 19/00
[52] U.S. Cl. ............................. 29/730; 29/623.1; 29/731
[58] Field of Search .................................... 29/730, 623.1, 29/73.1; 429/131, 132, 136

[56] References Cited

U.S. PATENT DOCUMENTS 5,044,067  9/1991  Wheadon et al. ........................ 29/730

FOREIGN PATENT DOCUMENTS 392 371  3/1991  Austria .
396 412  9/1993  Austria .
0 506 645  9/1992  European Pat. Off. .

*Primary Examiner*—M. Nuzzolillo
*Attorney, Agent, or Firm*—Young & Thompson

[57] ABSTRACT

A device for conveying and sectioning of separator strip in devices for producing pockets for battery plates with a conveyor means which conveys the separator strip to a device for dividing the separator strip into separator strip sections, and with another conveyor means which feeds the separator strip sections to a means for folding the separator strip sections around battery plates. The conveyor means for the separator strip and the separator strip sections are continuous conveyor belts supplied with negative pressure, which have several rows of holes and which are routed over chambers supplied with negative pressure. The side of the chamber supplied with negative pressure which faces the continuous conveyor belt has slot-like openings which align with the rows of holes in the continuous conveyor belt. The effective length of the slots of the chamber supplied with negative pressure, that is, the chamber of the conveyor means which is located after the means for dividing the separator strip, can be changed.

16 Claims, 5 Drawing Sheets

DEVICE FOR CONVEYING AND SECTIONING OF SEPARATOR STRIP

The invention relates to a device for conveying and sectioning of separator strip in devices for producing pockets for battery plates with a conveyor means which conveys the separator strip to a device for dividing the separator strip into separator strip sections, and with another conveyor means which feeds the separator strip sections to a means for folding the separator strip sections around battery plates.

A device of this type is known for example from EP 506 645 A1. In this known device the separator strip is moved to the cutting means and to the folding means using transport rollers which are assigned to a conveyor shaft. In these known devices equipped with conveyor rollers it is a problem that separator strip has an irregularly textured surface and does not have exactly straight edges, it frequently occurring that ribs provided on one side of the conveyor belt do not always run parallel to the longitudinal extension of the conveyor belt. Thus problems arise in the transportation of separator strip with conveyor rollers since the separator strip under the action of the conveyor rollers due to its texturing deviates from the conveyor direction, guidance via the edges of the conveyor belt not being simple, since they are themselves irregular and the separator strip does not have high stiffness.

The object of the invention is to devise a device of the initially mentioned type with which separator strip can be transported without problems to the cutting means and from there to the folding means.

This object is achieved according to the invention by the fact that the conveyor means for separator strip or separator strip sections have conveyor belts supplied with negative pressure.

Advantageous and preferred embodiments of the device according to the invention are the subject matter of the subclaims.

In the invention, conveyor means are used which have conveyor belts supplied with negative pressure so that the separator strip can be accurately transported without problems before and after it is divided into separator strip sections, without the danger of slippage and without the requirement of guiding its longitudinal edges in particular, so that a closed conveyor shaft, as is conventional in the known devices, is also largely superfluous. Also the folding shaft, in the area of which battery plates are pushed transversely to the longitudinal extension of the separator strip sections in order to fold the separator strip section around the front edge of the battery plate, can be reduced to essential elements, specifically limitation of the "slot", for example in the form of rollers.

Other details and features of the invention follow from the following description of one preferred embodiment, in which reference is made to the drawings.

Figure 1:
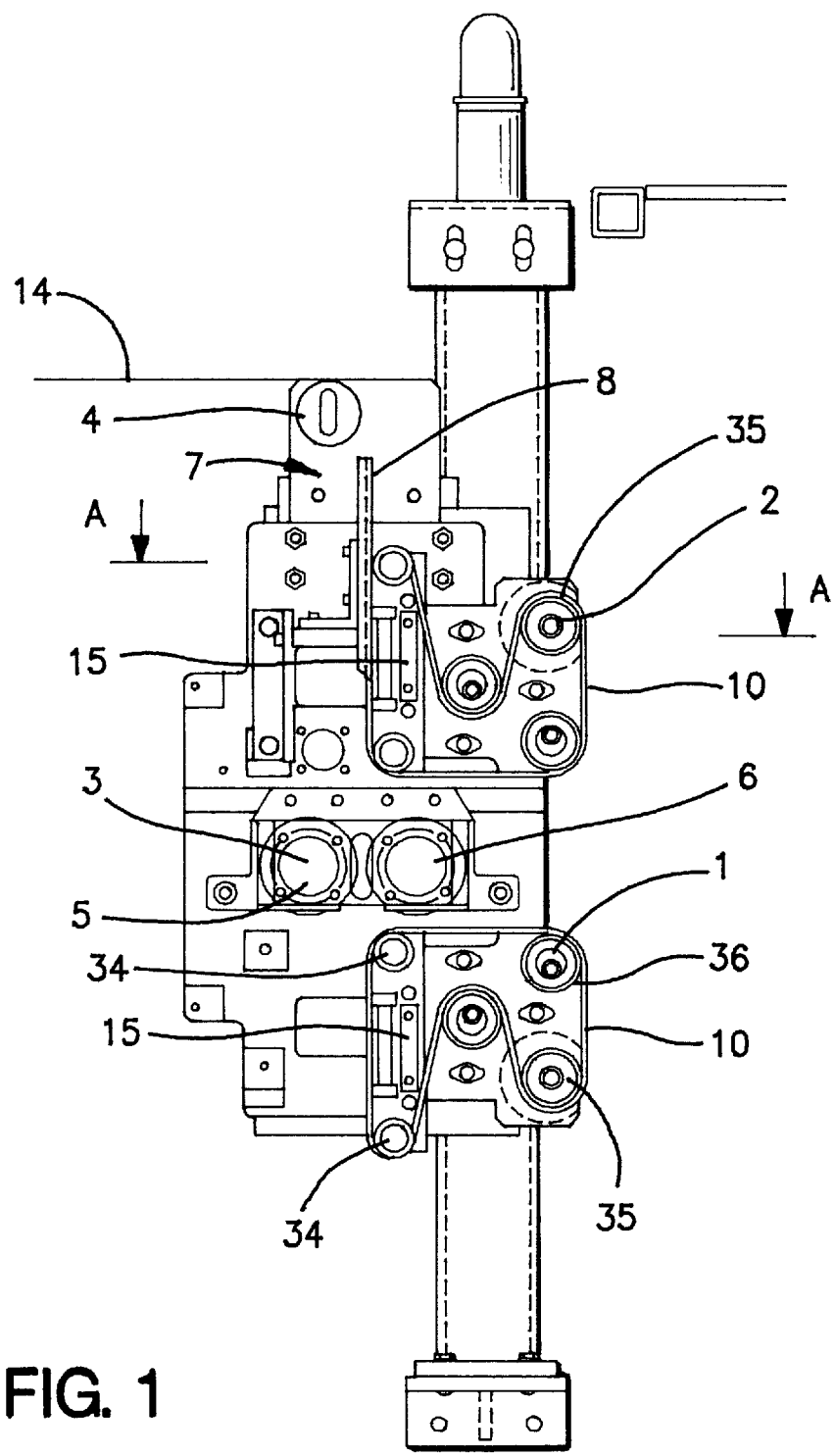
FIG. 1 shows in a side view a device for conveying and sectioning of separator strip.
Figure 2:
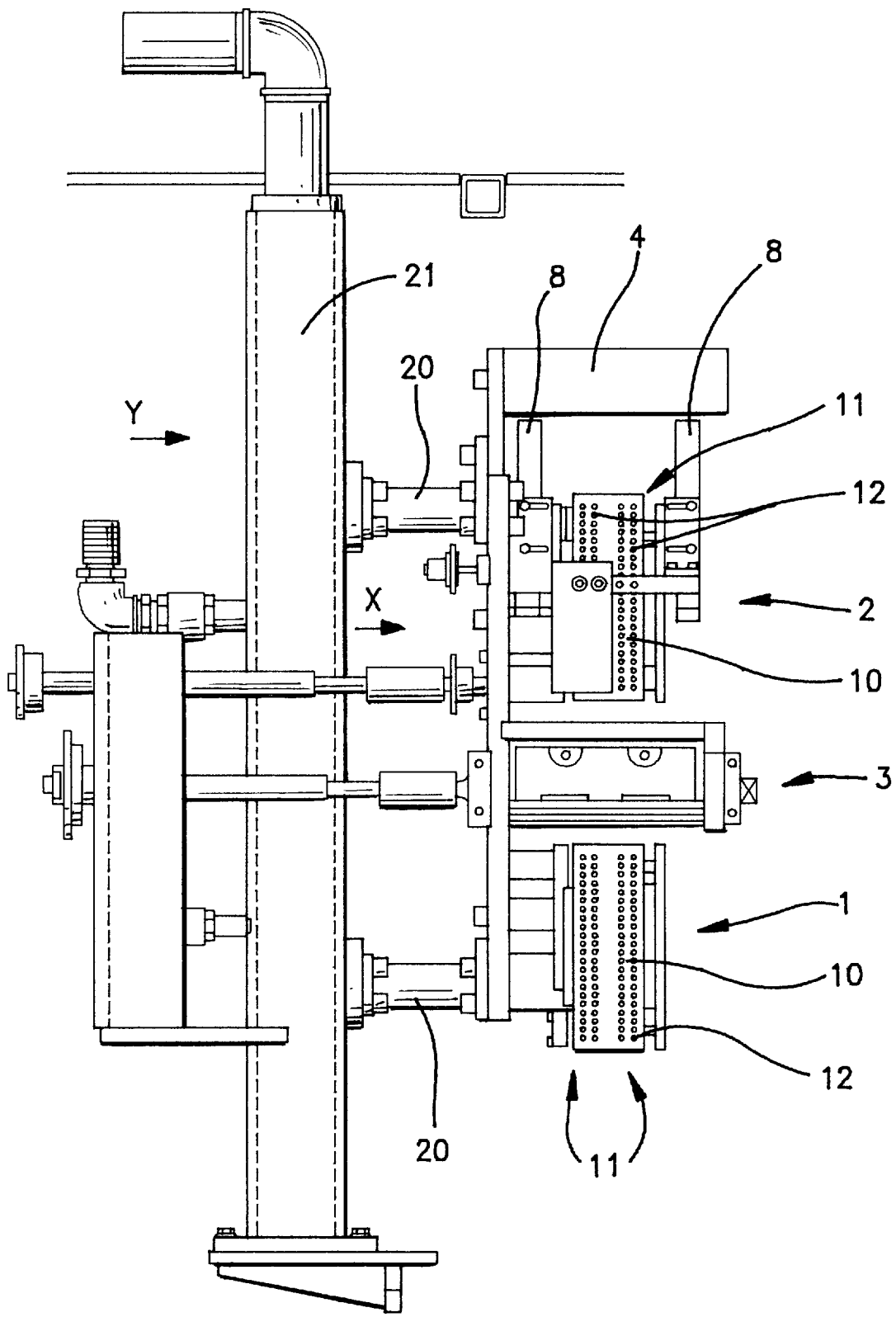
FIG. 2 the device from FIG. 1 viewed from the left of FIG. 1.

In the device shown in FIGS. 1 and 2 in its essential details for conveying separator strip 14 and cutting separator strip 14 into separator strip sections, separator strip 14 is unwound from a supply roll which is not shown and is delivered horizontally. Deflection roller 4 located in the upper area of the device, with a horizontal axis of rotation, deflects separator strip 14 into an essentially vertical plane and conveyor means 2, 1 continue to transport it. In doing so, to conveyor means 2 located at the top for better guidance of separator strip 14 when this conveyor means 2 starts, there is assigned guide means 7 in the form, as shown optionally, of a plate divided into two strips 8 which engage separator strip 14 on the side opposite conveyor means 2.

Between first conveyor means 2 and second conveyor means 1 there is device 3 for cutting separator strip 14 into separator strip sections. This device 3 in the embodiment is made as conventional rotary shears with two rotary-drive rollers 5, 6, of which one is equipped with a cutting blade.

Adjacent to second conveyor means 1 is a folding shaft (not shown) which, as is known, has a slot which runs transversely to the conveyor direction of the separator strip sections through conveyor means 1. This slot is located on the end of a plate transport (device for moving the battery plates) so that battery plates are pushed through the slot in the folding shaft and in the conventional manner at the same time a separator strip section prepared there is withdrawn from the folding shaft and folded around the front edge of the battery plate. The battery plate driven in this way into a separator strip section is sent to a device for joining the longitudinal edges of the separator strip section into a pocket for a battery plate.

Both conveyor means 2 and also conveyor means 1 are equipped with continuously revolving conveyor belt 10 which is provided with four rows 11 of holes 12, as shown in FIG. 2.

During its motion segment parallel to the conveyor plane of the separator strip through the device, conveyor belts 10 are moved past on chambers 15 supplied with negative pressure so that the negative pressure takes effect through opening 12 in conveyor belts 10 and holds the separator strip or separator strip sections against conveyor belts 10 so that they continue to be moved by conveyor means 1 and 2.

Figure 3:
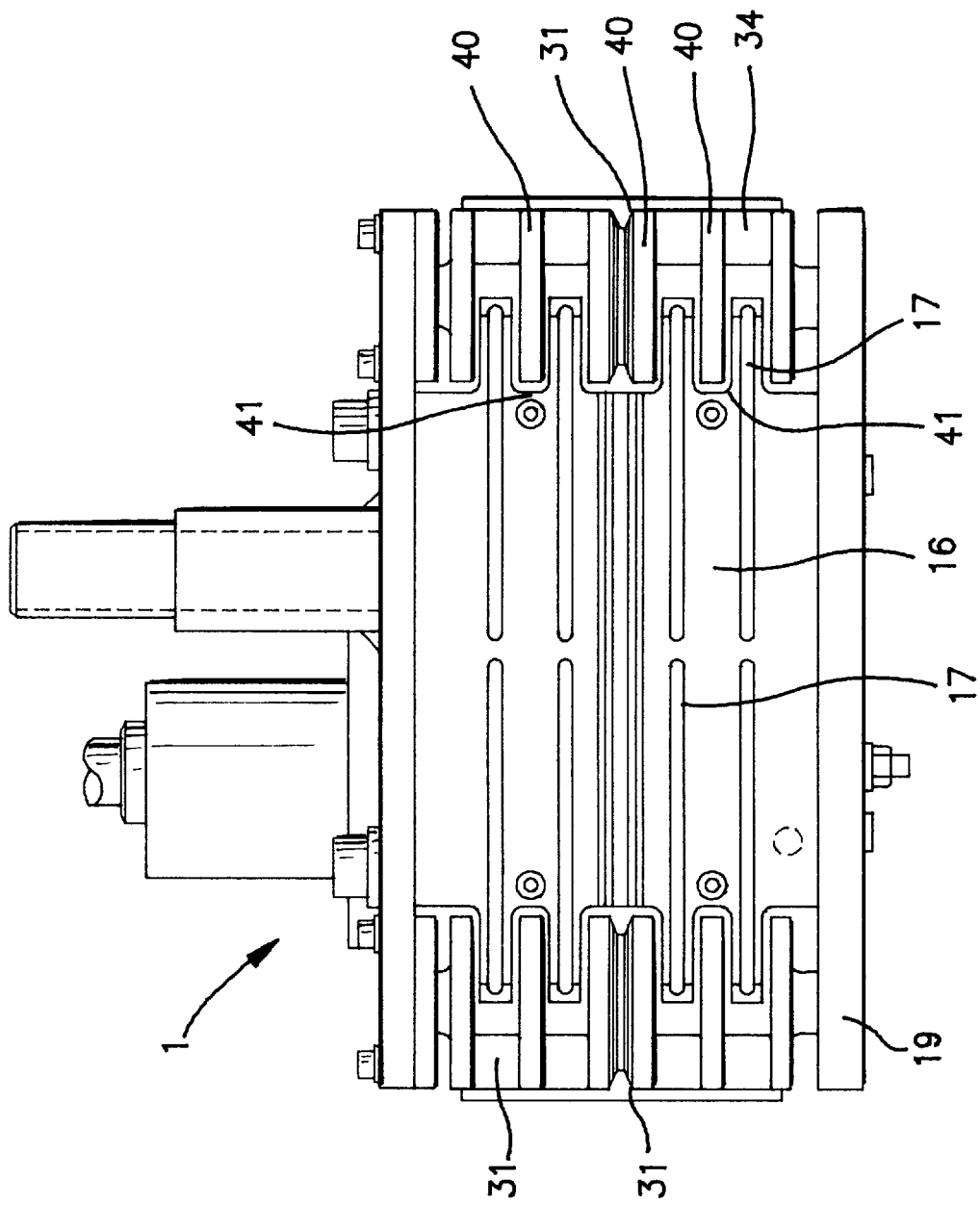
FIG. 3 on an enlarged scale one view of the conveyor means provided after the cutting means (without conveyor belt)
Figure 6:
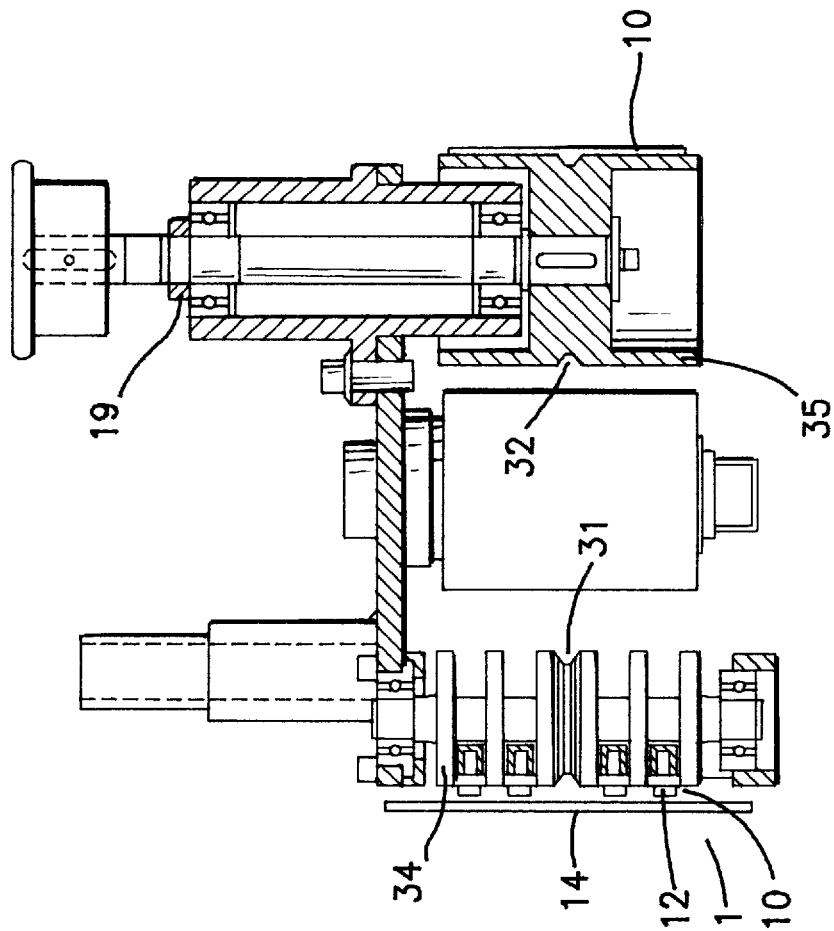
FIG. 6 a section along line A—A in FIG. 1.
Figure 4:
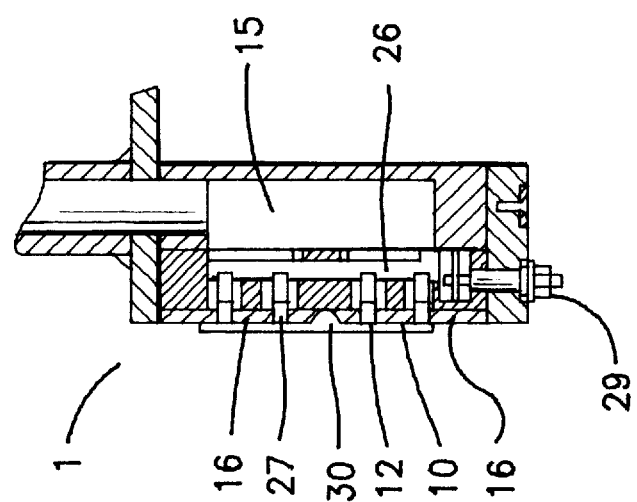
FIG. 4 a section along line C—C in FIG. 3.
Figure 5:
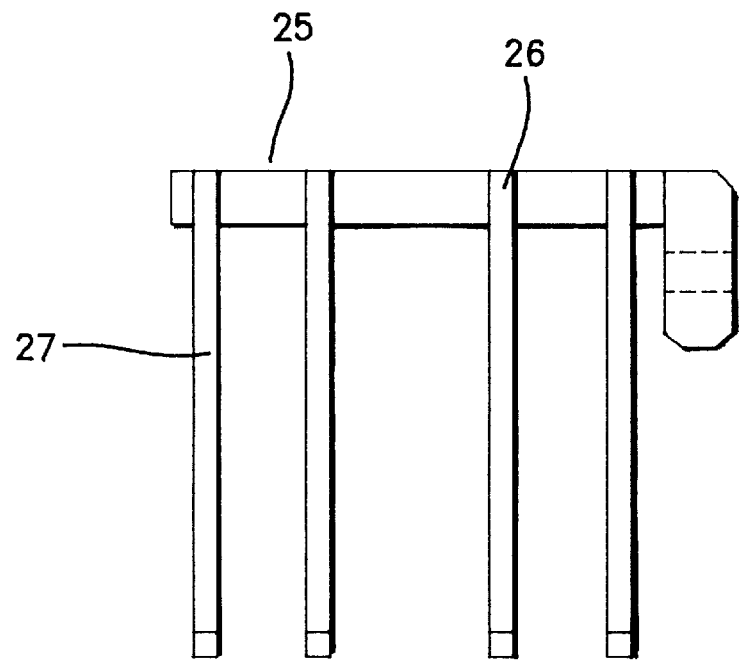
FIG. 5 and 5' the slide for changing the effective size (length) of the slots.
Figure 5:
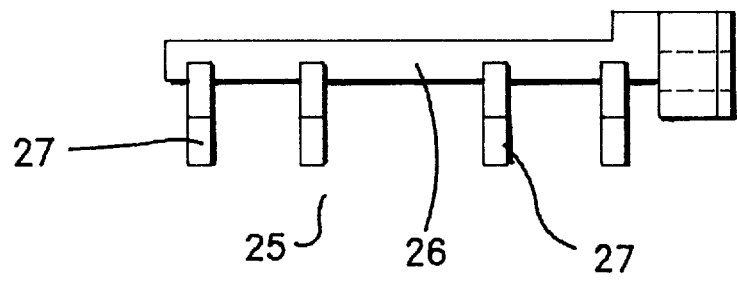

As is shown in FIGS. 3, 4, and 6 for conveyor means 1, the side of vacuum chamber 15 assigned to the continuous conveyor belt (i.e. the side facing separator strip 14 or one separator strip section) is covered by plate 16 with several slots 17. In this way negative pressure acts only in the area of rows 11 of holes in continuous conveyor belts 10 so that the friction of the latter on plate 16 is reduced. Furthermore, it is shown again in FIG. 3 that next to plate 16 provided with slots 17 there are two support strips 18 and 19 to improve the motion of continuous conveyor belt 10.

Chamber 15 which is to be supplied with negative pressure is connected via line 20, 21 to a vacuum means to which connecting line 20 for negative pressure chamber 15 assigned to conveyor means 2 is also joined.

In order to be able to adjust the effective length of slots 17, i.e., the size of the area of conveyor belt 10 in which openings 12 in the latter are supplied with negative pressure, on conveyor means 1 there is at least one sealing device 25 which has several sealing strips 27 provided on common carrier 26. These sealing strips 27 project into slots 17 of cover plate 16 of chamber 15 which can be supplied with negative pressure, as is shown in FIG. 4. By adjusting sealing strips 27 after loosening safety screw 29 (FIG. 4) the effective length of slots 17 can be changed. This is important since in this way the efficiency of second conveyor means 1 can be matched to the size of the battery plates and thus to the length of the separator strip sections in order that they are released from conveyor means 1 at the proper instant (when a battery plate is being pushed through the slot of the folded shaft).

The drawings, especially FIG. 4, show that continuous conveyor belt 10 has rib 30 which runs lengthwise, which projects on its back side, and with which it fits into grooves 31, 32 in drive or transport rollers 34 through 36 in order to ensure exact guidance of continuous conveyor belt 10. In this embodiment roller 35 is the roller which is coupled to the rotary drive. The rotary drives for drive rollers 35 of two conveyor means 1 and 2 are coupled to one another and are driven jointly so that conveyor belts 10 of two conveyor means 1, 2 move synchronously and simultaneously.

It is shown that upper and lower deflection roller 34 for conveyor belts 10 in conveyor means 2,1 is formed from several disks which, as shown in FIG. 3, fit into the corresponding recesses in slotted plate 16 in order than it can be made as long as possible and reliable transport of separator strip 14 or separator strip sections is possible.

Deflection rollers 34 on the ends of the area of conveyor belt 10 in which it abuts separator strip 14 or the separator strip section consists of several disks 40 which fit into grooves 41 on the edge aligned transversely to the conveyor direction, that is, the edge of plate 16 which is provided with slots and which covers the chamber on the conveyor belt-side.

In summary, the invention can be described as follows:

A device for conveying and sectioning of separator strip 14 in devices for producing pockets for battery plates has conveyor means 2 which conveys separator strip 14 to means 3 for dividing separator strip 14 into separator strip sections, and another conveyor means 1 which feeds the separator strip sections to a means for folding the separator strip sections around the battery plates. Conveyor means 1, 2 for separator strip 14 and the separator strip sections are continuous conveyor belts 10 which are supplied with negative pressure, which have several rows 11 of holes 12, and which are guided via chambers 15 supplied with negative pressure. The side of chamber 15 supplied with negative pressure which faces continuous conveyor belt 10 has slot-shaped openings 17 which align with rows 11 in continuous conveyor belt 10. The effective length of slots 17 of chamber 15 supplied with negative pressure, that is, the chamber of conveyor means 1 which is located after means 3 for dividing separator strip 14, can be changed.

We claim:

1. Device for conveying and sectioning of separator strip (14) in devices for producing pockets for battery plates with conveyor means (2) which conveys separator strip (14) to device (3) for dividing separator strip (14) into separator strip sections, and with another conveyor means (1) which feeds the separator strip sections to a means for folding the separator strip sections around the battery plates, characterized in that conveyor means (1, 2) for separator strip (14) or separator strip sections have conveyor belts (10) supplied with negative pressure.

2. Device according to claim 1, wherein conveyor belts (10) from one side engage separator strip (14) or separator strip sections.

3. Device according to claim 1, wherein two conveyor belts (10) are located on the same side of separator strip (14).

4. Device according to claim 1, wherein the conveyor belts are continuous conveyor belts (10) which have holes (12) or similar penetrations, and which each are guided over chamber (15) supplied with negative pressure.

5. Device according to claim 4, wherein conveyor belts (10) have several rows (11) of holes (12).

6. Device according to claim 4, wherein continuous conveyor belts (10) are guided via several rollers (34, 35, 36), of which at least one (35) is driven.

7. Device according to claim 6, wherein continuous conveyor belts (10) on their side facing rollers (34, 35, 36) have rib (30) which runs lengthwise and which fits into groove (31) in conveyor rollers (34, 35, 36).

8. Device according to claim 4, wherein the side of chamber (15) supplied with negative pressure facing continuous conveyor belt (10) has slot-shaped openings (17) which align with rows (11) of holes in continuous conveyor belt (10).

9. Device according to claim 8, wherein the effective length of slots (17) of chamber (15) supplied with negative pressure, that is, the chamber of at least additional conveyor means (1), can be changed.

10. Device according to claim 9, wherein there is slide (25) equipped with sealing strips (27) which fits into slots (17) for changing the effective length of slots (17) in chamber (15) supplied with negative pressure.

11. Device according to claim 1, wherein guide plate (7) or guide strips for separator strip (14) is assigned to conveyor means (2) for separator strip (14) located opposite conveyor belt (10).

12. Device according to claim 1, wherein two conveyor means (1, 2) are coupled to one another for simultaneous and synchronous drive.

13. Device according to claim 12, wherein there is a single drive motor which is coupled to drive rollers (35) of two conveyor belts (10).

14. Device according to claim 1, wherein deflection rollers (34) on the ends of the area of conveyor belt (10) in which it abuts separator strip (14) or the separator strip section consist of several disks (40) which fit into grooves (41) on the edge aligned transversely to the conveyor direction, that is, the edge of plate (16) which is provided with slots (17) and which covers chamber (15) on the conveyor belt-side.

15. Device according to claim 1, wherein device (3) for sectioning pieces of separator strip from the supplied separator strip has two rollers (5, 6), through the gap of which separator strip (14) is delivered, and wherein at least one of rollers (5, 6) has at least one cutting blade.

16. Device according to claim 1, wherein the means for folding separator strip sections which is adjacent to other conveyor means (1) has a folding shaft with a slot which extends transversely to the conveyor direction, and wherein there is a transport device for pushing the battery plates through the slot while at the same time folding a separator strip section around the front edge of the battery plate.

* * * * *

(12) EX PARTE REEXAMINATION CERTIFICATE (8740th)
United States Patent
Schwetz et al.

(10) Number: US 5,803,935 C1
(45) Certificate Issued: Dec. 13, 2011

(54) DEVICE FOR CONVEYING AND SECTIONING OF SEPARATOR STRIP

(75) Inventors: Anton Schwetz, Ebersdorf (AT); Josef Gruber, Birkfeld (AT); Anton Papst, Hirnsdorf (AT)

(73) Assignee: BM Battery Machines GmbH, Sebersdorf (AT)

Reexamination Request:
No. 90/010,718, Oct. 16, 2009

Reexamination Certificate for:
Patent No.: 5,803,935
Issued: Sep. 8, 1998
Appl. No.: 08/770,163
Filed: Dec. 19, 1996

(51) Int. Cl.
*B29C 65/78* (2006.01)
*B65H 20/10* (2006.01)
*H01M 2/18* (2006.01)
*H01M 2/14* (2006.01)

(52) U.S. Cl. .................. 29/730; 29/623.1; 29/731
(58) Field of Classification Search .................. None
See application file for complete search history.

(56) References Cited

To view the complete listing of prior art documents cited during the proceeding for Reexamination Control Number 90/010,718, please refer to the USPTO's public Patent Application Information Retrieval (PAIR) system under the Display References tab.

*Primary Examiner* — Carlos Lopez

(57) ABSTRACT

A device for conveying and sectioning of separator strip in devices for producing pockets for battery plates with a conveyor means which conveys the separator strip to a device for dividing the separator strip into separator strip sections, and with another conveyor means which feeds the separator strip sections to a means for folding the separator strip sections around battery plates. The conveyor means for the separator strip and the separator strip sections are continuous conveyor belts supplied with negative pressure, which have several rows of holes and which are routed over chambers supplied with negative pressure. The side of the chamber supplied with negative pressure which faces the continuous conveyor belt has slot-like openings which align with the rows of holes in the continuous conveyor belt. The effective length of the slots of the chamber supplied with negative pressure, that is, the chamber of the conveyor means which is located after the means for dividing the separator strip, can be changed.

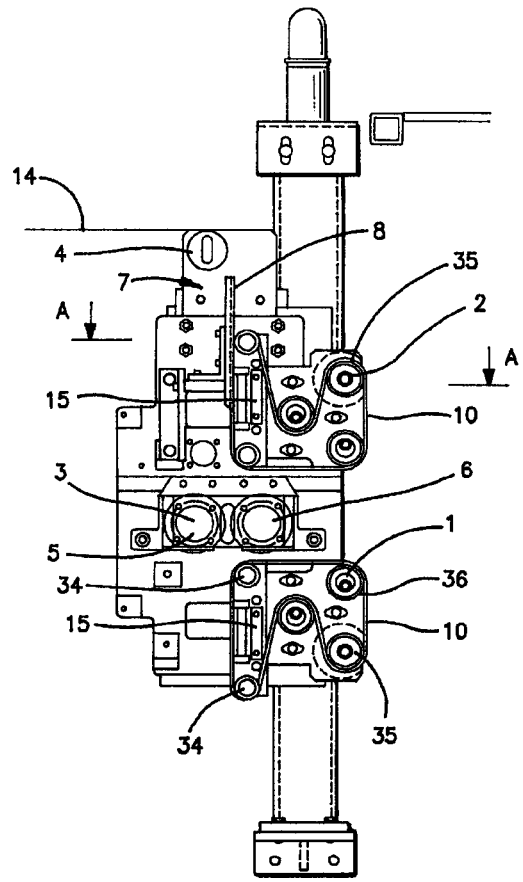

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 10 and 14 is confirmed.

Claims 1-9, 11-13 and 15-16 are cancelled.

New claims 17-19 and 20 are added and determined to be patentable.

*17. Device for conveying and sectioning of separator strip (14) in devices for producing pockets for battery plates with conveyor means (2) which conveys separator strip (14) to device (3) for dividing separator strip (14) into separator strip sections, and with another conveyor means (1) which feeds the separator strip sections to a means for folding the separator strip sections around the battery plates, characterized in that conveyor means (1, 2) for separator strip (14) or separator strip sections have conveyor belts (10) supplied with negative pressure;*

*wherein the conveyor belts are continuous conveyor belts (10) which have holes (12) or similar penetrations, and which each are guided over chamber (15) supplied with negative pressure;*

*wherein the side of chamber (15) supplied with negative pressure facing continuous conveyor belt (10) has slot-shaped openings (17) which align with rows (11) of holes in continuous conveyor belt (10);*

*wherein the effective length of slots (17) of chamber (15) supplied with negative pressure, that is, the chamber of at least additional conveyor means (1), can be changed; and*

*wherein there is slide (25) equipped with sealing strips (27) which fits into slots (17) for changing the effective length of slots (17) in chamber (15) supplied with negative pressure.*

*18. Device for conveying and sectioning of separator strip (14) in devices for producing pockets for battery plates with conveyor means (2) which conveys separator strip (14) to device (3) for dividing separator strip (14) into separator strip sections, and with another conveyor means (1) which feeds the separator strip sections to a means for folding the separator strip sections around the battery plates, characterized in that conveyor means (1, 2) for separator strip (14) or separator strip sections have conveyor belts (10) supplied with negative pressure;*

*wherein deflection rollers (34) on the ends of the area of conveyor belt (10) in which it abuts separator strip (14) or the separator strip section consist of several disks (40) which fit into grooves (41) on the edge aligned transversely to the conveyor direction, that is, the edge of plate (16) which is provided with slots (17) and which covers chamber (15) on the conveyor beltside.*

*19. Device for conveying and sectioning of a separator strip in devices for producing pockets for battery plates, comprising:*

*a device for dividing the separator strip into separator strip sections;*

*means for folding the separator strip sections around the battery plates;*

*first conveyor means for conveying the separator strip to the device for dividing the separator strip into separator strip sections; and*

*second conveyor means for feeding the separator strip sections from the device for dividing the separator strip into separator strip sections to the means for folding the separator strip sections around the battery plates;*

*wherein each of the first and second conveyor means comprises a conveyor belt having rows of holes, the conveyor belt being guided over a negative pressure chamber having slot-shaped openings aligned with the rows of holes, the negative pressure chamber comprising sealing strips that fit into the slot-shaped openings to allow adjustment of an effective length of the slot-shaped openings.*

*20. Device for conveying and sectioning of a separator strip in devices for producing pockets for battery plates, comprising:*

*a device for dividing the separator strip into separator strip sections;*

*means for folding the separator strip sections around the battery plates;*

*first conveyor means for conveying the separator strip to the device for dividing the separator strip into separator strip sections; and*

*second conveyor means for feeding the separator strip sections from the device for dividing the separator strip into separator strip sections to the means for folding the separator strip sections around the battery plates;*

*wherein the first and second conveyor means comprise conveyor belts supplied with negative pressure; and*

*wherein each of the conveyor belts is arranged to pass over a plate provided with slots through which the negative pressure is applied, each of the conveyor belts passing over deflection rollers disposed at either end of the plate, the deflection rollers comprising several disks arranged to fit into grooves disposed at said either end of the plate.*

\* \* \* \* \*